May 25, 1954 — F. C. MULLANEY ET AL — 2,679,617
MULTIPLE INPUT COINCIDENCE CIRCUIT WITH PARALYSIS FEATURE
Filed April 2, 1952
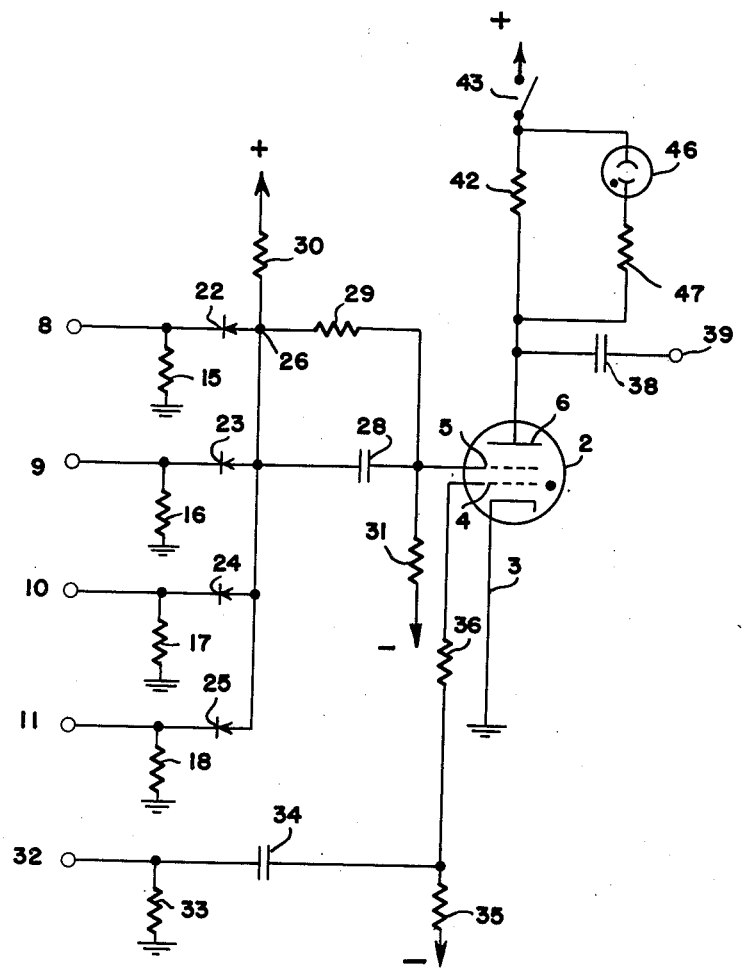
INVENTORS
FRANK C. MULLANEY
JOHN L. HILL
BY
ATTORNEYS Patented May 25, 1954

2,679,617

UNITED STATES PATENT OFFICE 2,679,617

MULTIPLE INPUT COINCIDENCE CIRCUIT WITH PARALYSIS FEATURE

Frank C. Mullaney, St. Paul, and John L. Hill, North St. Paul, Minn., assignors, by mesne assignments, to the United States of America as represented by the Secretary of the Navy Application April 2, 1952, Serial No. 279,982

2 Claims. (Cl. 315—129)

This invention relates to a thyratron control circuit that is triggered by the coincidence of multiple input pulses. More particularly the circuit is one which includes a thyratron tube having two control electrodes to which a number of input pulses are applied. When the pulses coincide in point of time the thyratron is triggered. When the tube conducts, the grids may be said to have lost control of the circuit. A separate mechanism is provided in order that the tube may cease conducting after a desired time. When this reset means is operated, the grids regain control of the circuit.

It is often desirable to utilize a thyratron tube having two control electrodes. One grid may be biased sufficiently negative with respect to the cathode of the tube so that a pulse or a series of pulses of a predetermined magnitude applied to the other grid is unable to trigger the tube.

For some applications it may be desirable to actuate a circuit only on the first occasion that a number of events occur simultaneously. If these events are translated into electrical pulses and applied to the control electrodes of a thyratron, the tube may be arranged to conduct and produce an output pulse on only the first such stimulus. For practical operation these parallel inputs, even though tied to a common lead, must not introduce back voltages into each other's circuits. The present invention combines a group of input voltages so that there are no undesirable back effects.

In the past, the firing point of a thyratron has usually been determined by the effect of signal voltages placed on one or the other of two grids. That is to say, an input pulse was applied to one grid, the potential of the second grid being constant. It has also been known that a positive charge on one grid was insufficient to trigger the tube until the second electrode became positive also. Such an arrangement, however, was not capable of making the tube responsive to more than two external conditions.

The present invention obviates previous difficulties by tying a group of parallel inputs to one of the control electrodes of a thyratron having two electrodes possessing control properties. If desired, the invention may be arranged so that fewer than all the input pulses need coincide to fire the tube. It may be arranged so that any desired combination of pulses will be effective to cause conduction.

This invention also provides rectifier means in each input lead so that a voltage pulse in one input lead cannot be applied back into any other input circuit.

It is an object of the invention to provide a control circuit including a thyratron tube which is actuated only by concurrent application of a multiplicity of input voltages.

It is a further object to provide a thyratron control circuit wherein the grids lose control of conduction after an initial control action, and regain it after a reset action takes place.

It is a still further object to provide a control circuit wherein a thyratron tube is fired by concurrent application of a number of input pulses to the grids thereof and in which there is no interaction voltage from one input to another input.

It is a still further object to provide a thyratron tube control circuit in which a particular simultaneous set of input pulses fire the tube on their first occurrence, and wherein the input pulses of succeeding identical sets are powerless to produce any action until the tube is reset.

It is a still further object of the invention to provide a control circuit in which a thyratron tube is fired only by the concurrent application of a multiplicity of input voltages and wherein there is an indicator to show whether or not the thyratron has been fired.

Other objects and advantages of the invention will hereinafter become more fully apparent from the following description of the annexed drawings, which illustrate a preferred embodiment, and wherein Figure 1 illustrates a preferred embodiment of the circuit.

Referring now to the drawings, wherein like reference characters designate like or corresponding parts throughout the several views, there is shown in Figure 1, a thyratron tube 2 having a cathode 3, a first control grid 4, a second control grid 5, and an anode 6.

The control grid 5 has a multiplicity of input leads 8, 9, 10, and 11 which are grounded through resistors 15, 16, 17, and 18, respectively.

Each of the input leads includes a unidirectional current conductor which may be of any conventional type, such as a diode, a dry disc rectifier, etc. In Figure 1 dry disc rectifiers 22, 23, 24, and 25 are illustrated. They act to isolate each input lead from every other input lead. The rectifiers are connected to a positive source of current at point 26. The inputs are all tied to a common input condenser 28. Resistors 29, 30, and 31 provide a path for current from the current source to ground.

Control grid 4 also has an input lead 32, which is grounded through resistor 33 and which connects to coupling condenser 34 and resistor 36. Resistor 35 provides a connection for resistor 36 to a source of negative potential.

An output current is taken from the thyratron tube through condenser 38 and output terminal 39. The anode of the tube is connected to a source of positive voltages through resistor 42 and reset switch 43. An indicator, such as neon lamp 46, is connected across resistor 42 by means of resistor 47. When the tube conducts the neon lamp lights up.

The operation of the circuit is as follows:

The current through resistor 30 in addition to flowing through resistor 29 divides approximately equally into the four circuit branches consisting of rectifier 22 and resistor 15, rectifier 23 and resistor 16, etc. The values of the four resistors 15 through 18, as well as the direction of conduction of the rectifiers 22 through 25 are chosen with respect to the value of resistor 30 so that as long as there is conduction through at least one of these branches the point 26 remains substantially at zero or ground potential.

The presence of an input pulse of positive potential at any of the input terminals 8 through 11 will cause the high potential side of the respective resistors 15 through 18 to become more positive. Assuming, for example, that the input pulse is applied at terminal 8 current flow through resistor 30 and rectifier 22 will be substantially cut off. When all four rectifiers 22 through 25 are thus cut off, there is produced a positive pulse at point 48 which is passed by capacitor 28 to the control grid 5. Grid 5 is normally held at a negative potential by its connection with resistor 31. Resistor 21 must be of such a value in comparison to resistors 29 and 30 that grid 5 is maintained at a negative potential when point 26 is at ground, and at a positive potential when rectifiers 22 through 25 are all cut off and point 26 is at positive potential. The presence of positive voltages on grids 4 and 5 simultaneously permits the positive potential of anode 6 with respect to ground to ionize the gas in tube 2.

A current then flows from the positive anode supply through switch 43, resistor 42, anode 6, cathode 3, and thence to ground. At the occurrence of the anode current flow, a large change in potential is communicated to output terminal 39 through capacitor 38. For the duration of this anode current flow, the voltage drop across resistor 42 provides a potential sufficient to cause the neon indicator lamp 46 to glow and provide visual indication of the circuit condition. No subsequent input signal combinations affect the signal output at terminal 39 until switch 43 has been operated to stop the flow of anode current and reestablish the control of the input circuits.

During the time the grids lose control of conduction—no matter whether the incoming pulses are coincident, and no matter what their magnitude is—they will have no effect on the operation of the tube. However after the tube is de-ionized due to the reset action of switch 43, the grids regain control of the circuit. Incoming pulses will be effective once again to trigger the thyratron and repeat the cycle.

It is to be understood that although the embodiment illustrated has four input leads to control grid 5 and only one lead to control grid 4, the number may be varied to fit the circumstances. By interchanging or substituting the circuits connected to the two control electrodes, the number of input leads to each grid may be varied. It is also within the scope of the invention to permit the circuit to be operated by fewer than the total number of input leads. By causing the individual input circuits connected to inputs 8 through 11 to be disconnected from the common circuit by removal of one of the rectifying elements 22 through 25, or by an equivalent opening of any input circuit at this point, the circuit will function in a manner similar to that described above.

It is of course desirable that one input voltage should not reflect an undesired voltage back into any of the other input leads. An important feature of this invention resides in the use of unidirectional current conductors in the input leads. In addition to their function as previously described, they act to isolate each lead from every other lead since current cannot flow backward through them from one to another of the input circuits.

It is apparent that the present invention provides a unique circuit combination. A number of input pulses may be utilized to actuate the circuit. All or some combination less than all of the inputs can be used. Each of the input leads is isolated from the others so that no unwanted voltages will be reflected back into the respective input circuits. An indicator is also included so that there will be a visual signal when the thyratron is in a state of conduction.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A control circuit responsive to simultaneous actuation from a plurality of sources, comprising a gas-filled tube having a cathode, an anode and at least two grids, means connecting said cathode to ground, a first source of positive potential, an anode resistor connecting said first source of positive potential to said anode, a plurality of first input circuits including a plurality of first input terminals, a plurality of grid resistors connecting respective ones of said first input terminals to ground, a plurality of rectifiers connecting said input terminals to a juncture, a second source of positive potential, a resistor connecting said second source of positive potential to said juncture, a resistor and a capacitor connected in parallel with each other inter-connecting said juncture and one of said control grids, a second input terminal, a grid resistor connecting said second input terminal to ground, a source of negative potential, individualized resistors connecting said first and second control grids to said source of negative potential, whereby said gas tube is rendered non-conductive and unresponsive to either of said control grids, means coupling said second input terminal to the other of said control grids, whereby simultaneous application of a positive voltage to one of said first input terminals and to said second input terminal renders said gas tube conductive, and indicator means responsive to the voltage drop appearing across said anode resistor to indicate conduction of said tube.

2. The combination as claimed in claim 1 which includes normally closed switch means in series with said anode to restore said gas tube to non-conduction.

References Cited in the file of this patent

UNITED STATES PATENTS

| Number | Name | Date |
|---|---|---|
| 2,461,895 | Hardy et al. | Feb. 15, 1949 |
| 2,477,976 | Frommer | Aug. 2, 1949 |
| 2,498,986 | Dunn et al. | Feb. 28, 1950 |
| 2,543,442 | Dench | Feb. 27, 1951 |
| 2,557,729 | Eckert | June 19, 1951 |